(12) United States Patent
McGee et al.

(10) Patent No.: US 12,346,334 B1
(45) Date of Patent: *Jul. 1, 2025

(54) AUTOMATED ANNOTATION SYSTEM FOR ELECTRONIC LOGGING DEVICES

(71) Applicant: Samsara Inc., San Francisco, CA (US)

(72) Inventors: Sean McGee, Woodstock, GA (US); Michael Gregory Ross, San Mateo, CA (US); Derrek Harrison, San Francisco, CA (US); Jonte Craighead, San Francisco, CA (US); Ijeoma Emeagwali, San Francisco, CA (US); Michael Luis Innocenzi, San Francisco, CA (US); Yosub Shin, Seoul (KR); John Lee, San Francisco, CA (US); Faiz Abbasi, San Francisco, CA (US); Zach Kohl, San Francisco, CA (US); Albert Hu, Foster City, CA (US); Emma Ferguson, Oakland, CA (US); Alan Guihong Liu, San Francisco, CA (US); Corbin Muraro, Berkeley, CA (US)

(73) Assignee: Samsara Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/456,114

(22) Filed: Aug. 25, 2023

Related U.S. Application Data

(63) Continuation of application No. 16/897,319, filed on Jun. 10, 2020, now Pat. No. 11,782,930.

(51) Int. Cl.
*G06F 16/2457* (2019.01)
*G06F 16/248* (2019.01)

(52) U.S. Cl.
CPC ...... *G06F 16/24573* (2019.01); *G06F 16/248* (2019.01)

(58) Field of Classification Search
CPC ............... G06F 16/24573; G06F 16/248
See application file for complete search history.

(56) References Cited

U.S. PATENT DOCUMENTS

| | | | |
|---|---|---|---|
| 8,018,329 B2 * | 9/2011 | Morgan | G06Q 10/08 340/5.72 |
| 9,158,414 B1 | 10/2015 | Gluzberg et al. | |
| 9,832,606 B1 | 11/2017 | Jones, II et al. | |
| 10,102,495 B1 | 10/2018 | Zhang et al. | |
| 10,196,071 B1 | 2/2019 | Rowson et al. | |

(Continued)

OTHER PUBLICATIONS

"U.S. Appl. No. 16/897,319, Non Final Office Action mailed Jan. 25, 2022", 21 pgs.
"U.S. Appl. No. 16/897,319, Response filed Apr. 25, 2022 to Non Final Office Action mailed Jan. 25, 2022", 12 pgs.
"U.S. Appl. No. 16/897,319, Final Office Action mailed May 16, 2022", 12 pgs.

(Continued)

*Primary Examiner* — Yuk Ting Choi
(74) *Attorney, Agent, or Firm* — Schwegman Lundberg & Woessner, P.A.

(57) ABSTRACT

An automated annotation system to automatically designate annotations to records within a report, which may perform operations that include: designating an annotation to a location, the annotation comprising a text string; identifying a record of the location within a report; selecting the annotation based on the record of the location within the report; and applying the text string of the annotation to the record within the report, according to certain example embodiments.

15 Claims, 8 Drawing Sheets

(56) References Cited

U.S. PATENT DOCUMENTS

| | | | |
|---|---|---|---|
| 2008/0030376 A1* | 2/2008 | Tunnell | G07C 5/085 |
| | | | 340/988 |
| 2013/0332004 A1* | 12/2013 | Gompert | G06F 16/73 |
| | | | 701/1 |
| 2015/0181016 A1 | 6/2015 | Jain et al. | |
| 2017/0276497 A1* | 9/2017 | Andrew | G01C 21/3423 |
| | | | 707/737 |
| 2017/0277671 A1 | 9/2017 | Duggan et al. | |
| 2018/0189913 A1* | 7/2018 | Knopp | H04W 4/021 |
| | | | 707/737 |
| 2018/0372503 A1* | 12/2018 | Bagchi | G06N 20/00 |
| | | | 707/737 |
| 2020/0309544 A1* | 10/2020 | Ozturk | G07C 5/008 |
| | | | 707/737 |
| 2021/0042724 A1 | 2/2021 | Rathod | |
| 2021/0390106 A1* | 12/2021 | McGee | G06F 16/24573 |
| | | | 707/999.003 |

OTHER PUBLICATIONS

"U.S. Appl. No. 16/897,319, Response filed Jul. 11, 2022 to Final Office Action mailed May 16, 2022", 10 pgs.

"U.S. Appl. No. 16/897,319, Non Final Office Action mailed Sep. 9, 2022", 16 pgs.

"U.S. Appl. No. 16/897,319, Response filed Nov. 10, 2022 to Non Final Office Action mailed Sep. 9, 2022", 10 pgs.

"U.S. Appl. No. 16/897,319, Final Office Action mailed Nov. 30, 2022", 15 pgs.

"U.S. Appl. No. 16/897,319, Response filed Feb. 1, 2023 to Final Office Action mailed Nov. 30, 2022", 10 pgs.

"U.S. Appl. No. 16/897,319, Non Final Office Action mailed Mar. 6, 2023", 15 pgs.

"U.S. Appl. No. 16/897,319, Response filed May 2, 2023 to Non Final Office Action mailed Mar. 6, 2023", 11 pgs.

"U.S. Appl. No. 16/897,319, Notice of Allowance mailed May 31, 2023", 12 pgs.

\* cited by examiner

400

RECEIVING AN INPUT THAT PROVIDES A SELECTION OF AN IDENTIFIER
402

ACCESSING THE REPORT BASED ON THE SELECTION OF THE IDENTIFIER
404

CAUSING DISPLAY OF A PRESENTATION OF THE REPORT, THE PRESENTATION OF THE REPORT INCLUDING A DISPLAY OF THE TEXT STRING OF THE ANNOTATION
406

AUTOMATED ANNOTATION SYSTEM FOR ELECTRONIC LOGGING DEVICES

PRIORITY APPLICATION

This application is a continuation of and claims priority to U.S. patent application Ser. No. 16/897,319, filed on Jun. 10, 2020, the disclosure of which is incorporated by reference herein in its entirety.

TECHNICAL FIELD

Embodiments of the present disclosure relate generally the field of communication technology and, more particularly, but not by way of limitation, to a system to automate annotations of data objects within a database.

BACKGROUND

An Electronic Logging Device (ELD) is electronic hardware that is attached to commercial motor vehicles to record driving hours. The driving hours of commercial drivers (i.e., truck and bus drivers) are typically regulated by a set of rules. An ELD monitors a vehicle to capture data on whether the vehicle is moving, whether the engine is running, miles driven, and duration of engine operation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
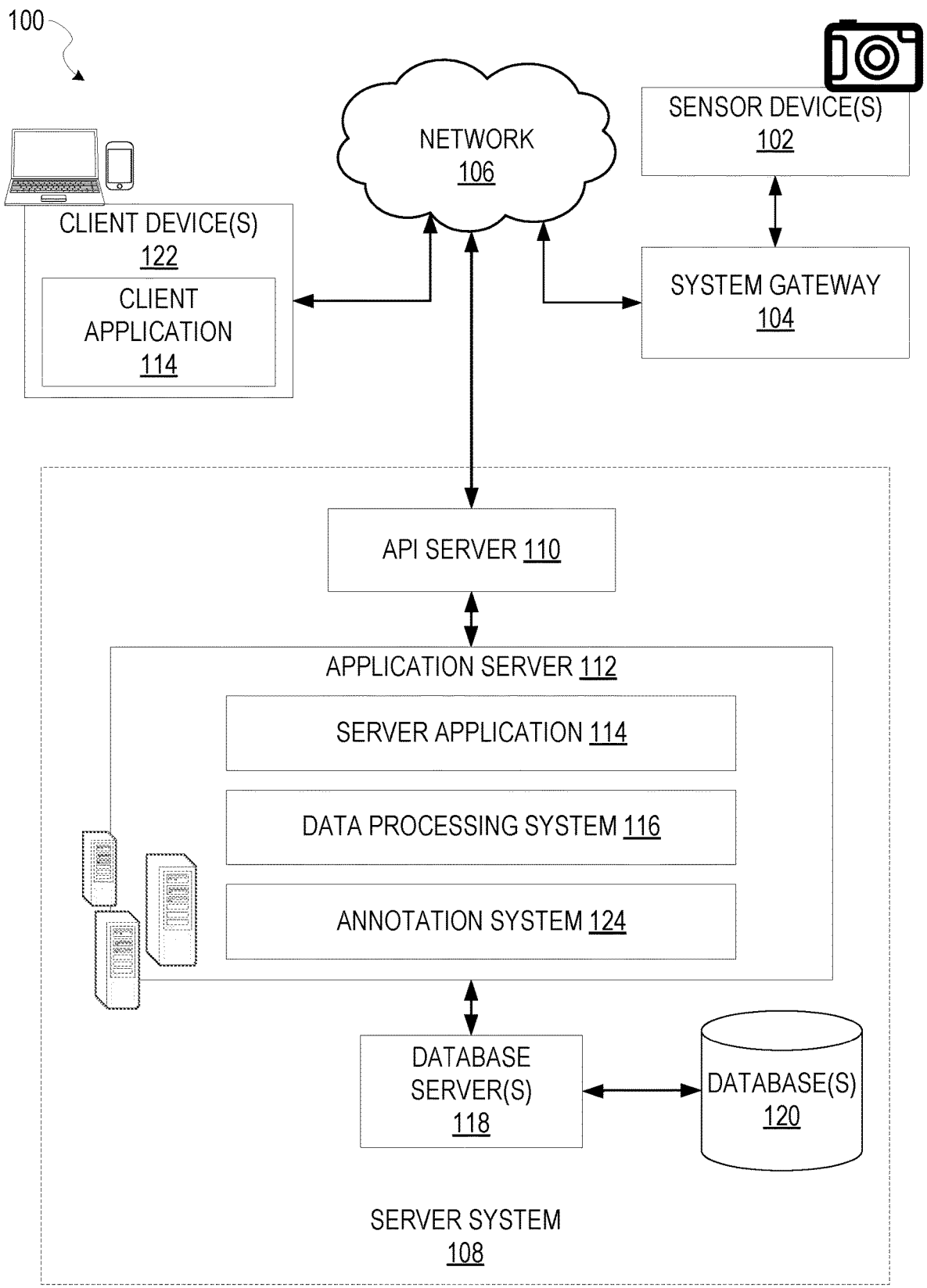
FIG. 1 is a block diagram showing an example system for exchanging data (e.g., sensor data and associated content) over a network in accordance with some embodiments, wherein the system includes an annotation system.

As discussed above, an ELD monitors a vehicle to capture data on whether the vehicle is moving, whether the engine is running, miles driven, and duration of engine operation. According to certain regulations, law enforcement officers may review the tracked information from an ELD by a printed report which must be generated by an administrator of an ELD. The creation of such reports is often time consuming and tedious, as there is often a need to apply notes or annotation to data depicted by the tracked data, in order to prove compliance with governing rules. Accordingly, a system to automatically apply annotations to records, including unassigned records, within a report are discussed herein.

Example embodiments described herein relate to an automated annotation system to automatically designate annotations to records within a report, which may perform operations that include: designating an annotation to a location, the annotation comprising a text string; identifying a record of the location within a report; selecting the annotation based on the record of the location within the report; and applying the text string of the annotation to the record within the report, according to certain example embodiments.

In some example embodiments, the record of the location within the report may be associated with an identifier that identifies a vehicle, or a client device which may correspond with the vehicle. For example, a vehicle may be equipped with a client device which tracks vehicle information that includes location information, vehicle diagnostics information, driving duration, when the vehicle is keyed on or off, as well as how long the vehicle has been driving. Accordingly, in certain embodiments, a user of the automated annotation system may provide an input that comprises a selection of the identifier associated with the record within the report. Responsive to receiving the input that includes the selection of the identifier, the automated annotation system may access a repository to generate the report, in order to cause display of a presentation of the report that includes the record.

The report may for example comprise a spreadsheet, or data table, that comprises a listing of locations or driving segments associated with a vehicle which may be identified by a vehicle identifier. According to certain embodiments, a driving segment may be defined as a corridor that connects one or more locations, such as a starting location and a destination location. The report generated by the automated annotation system may therefore include a listing of driving segments associated with a vehicle, along with other information that includes: date; time; engine hours; driving time; vehicle miles; driver identifier; location; as well as a field for notes and annotations which may be input manually or automatically based on the methods discussed herein. For example, the report may comprise a plurality of records, wherein each record corresponds with a distinct driving segment. Accordingly, a user of the automated annotation system may designate an annotation to a location, or a specific driving segment, such that responsive to identifying a record of the location or driving segment within a report, the automated annotation system may apply the annotation to the record.

In some embodiments, designation of an annotation to a location or driving segment may include designating the annotation to a geo-fence that encompasses some or all of the location or driving segment. For example, the automated annotation system may generate and cause display of a GUI that comprises a presentation of a map image that depicts a geographic area. The user of the automated annotation system may provide inputs that define a boundary that encompasses a location, or portions of a driving segment within the map image, for example by selecting a set of points, or by drawing a closed shape upon the map image. The automated annotation system may generate a geo-fence based on the boundary defined by the inputs. Accordingly, the user of the automated annotation system may designate an annotation to the geo-fence by providing an input that includes a text string.

Responsive to detecting a vehicle (or client device equipped within a vehicle) within the boundary of the geo-fence, or identifying a driving segment of the vehicle within the geo-fence, the automated annotation system may generate a record to be added to a report associated with an identifier of the vehicle, wherein the record include the annotation designated to the geo-fence.

FIG. 1 is a block diagram showing an example system 100 for automatically applying annotations to a record within a report, based on certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor device(s) 102, and the system gateway 104. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an annotation system 124. The annotation system 124 is configured to access records within a repository (i.e., the databases 120) and automatically apply annotations to at least a portion of the records based on corresponding attributes of the records, according to some example embodiments. Further details of the annotation system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
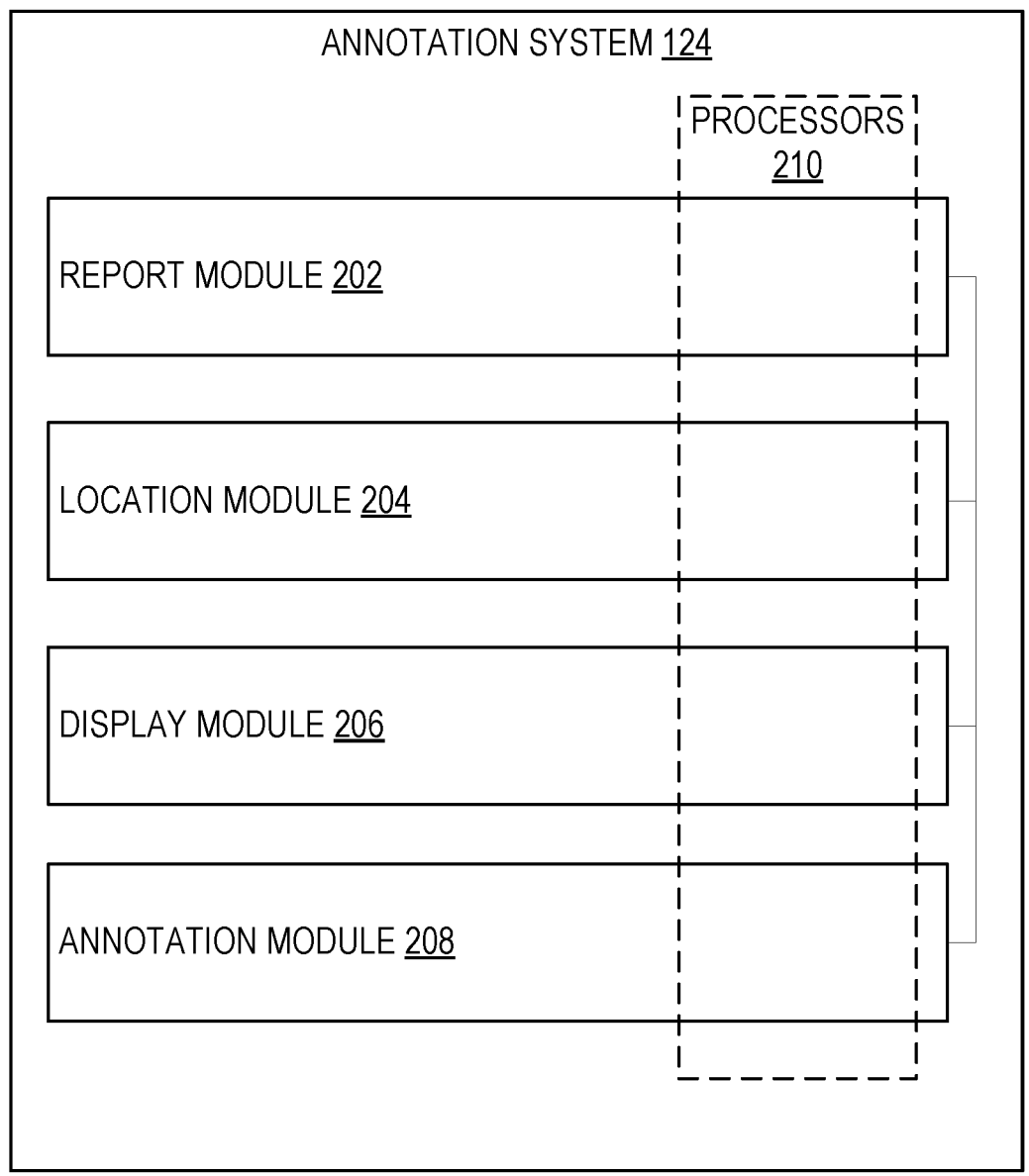
FIG. 2 is a block diagram illustrating various modules of an annotation system, according to certain example embodiments.

FIG. 2 is a block diagram illustrating components of the annotation system 124 that configure the annotation system 124 to perform operations to automatically assign annotations to one or more data records within a report, according to some example embodiments.

The annotation system 124 is shown as including a report module 202, a location module 204, a display module 206, and an annotation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the annotation system 124 may physically include an arrangement of one or more of the processors 210 (e.g., a subset of or among the one or more processors of the machine) configured to perform the operations described herein for that module. As another example, any module of the annotation system 124 may include software, hardware, or both, that configure an arrangement of one or more processors 210 (e.g., among the one or more processors of the machine) to perform the operations described herein for that module. Accordingly, different modules of the annotation system 124 may include and configure different arrangements of such processors 210 or a single arrangement of such processors 210 at different points in time. Moreover, any two or more modules of the annotation system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
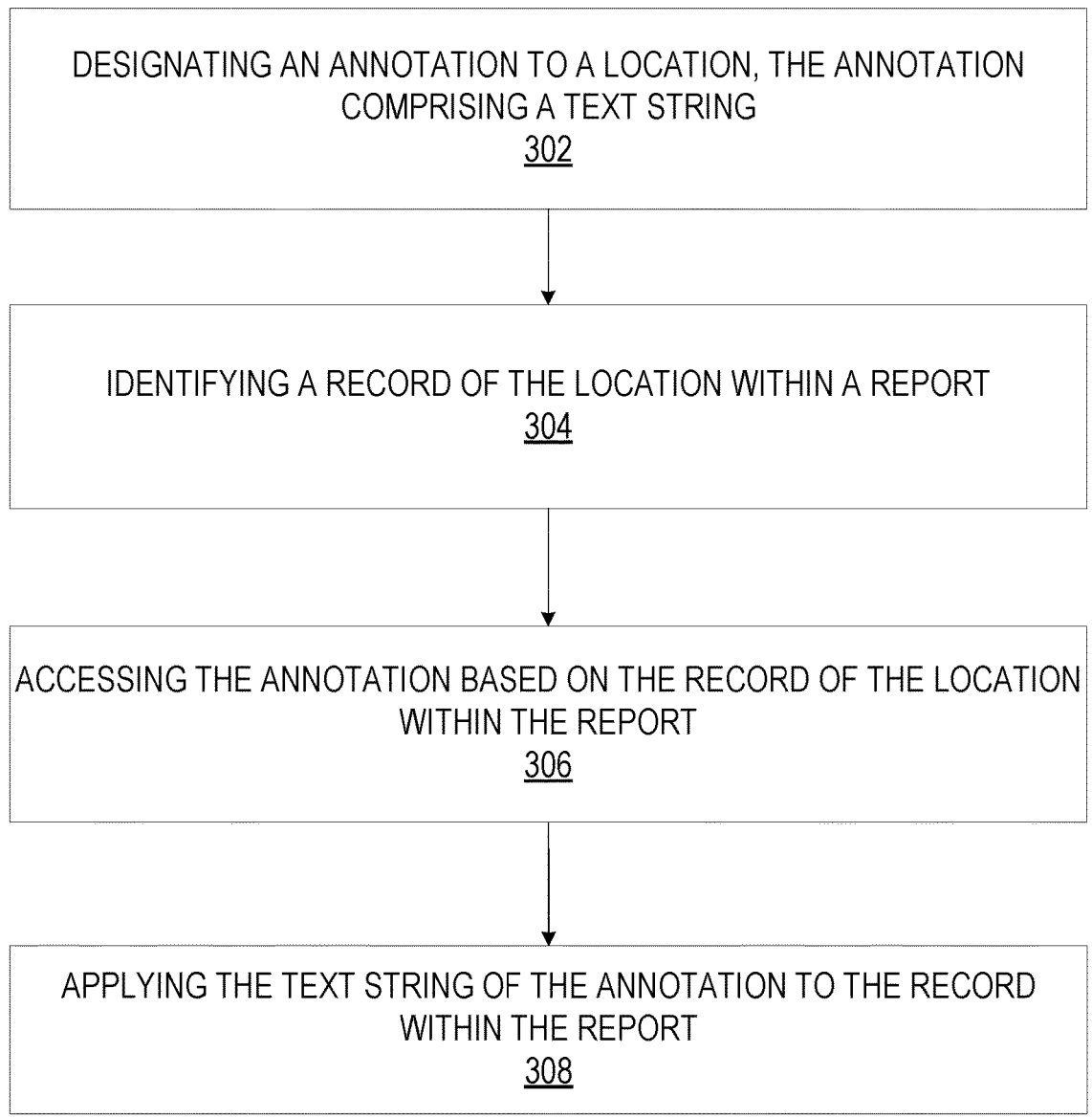
FIG. 3 is a flowchart depicting a method of automatically selecting an annotation to assign to a record, according to certain example embodiments.

FIG. 3 is a flowchart depicting a method 300 of automatically selecting an annotation to assign to a record within a report, according to certain example embodiments. Operations of the method 300 may be performed by the modules described above with respect to FIG. 2. As shown in FIG. 3, the method 300 includes one or more operations 302, 304, 306, and 308.

At operation 302, the annotation module 208 receives an input that designates an annotation to a location or driving segment, wherein the annotation comprises a text string. For example, as discussed above, according to certain embodiments, a user of the automated annotation system 124 may provide an input that identifies a location or driving segment within a map image. Responsive to receiving the input that identifies the location or driving segment within the map image, the automated annotation system 124 may provide one or more GUI configured to define an annotation based on an input that includes a text string.

According to certain embodiments, a location may be identified based on a set of coordinates, an address, a selection of one or more points within a map image, a text input that specifies a name of the location, as well as a selection (or creation) of a geo-fence that encompasses the location. In further embodiments, a user may define a driving segment by providing an input that specifies one or more locations (i.e., a starting location and a destination location), or by indicating a location or geographic area that encompasses the driving segment.

At operation 304, the report module 202 identifies a record that includes an indication of the location or driving segment within a report. For example, the report may include an ELD report associated with a vehicle that comprises a listing of driving segments and locations of the vehicle over a period of time. At operation 306, responsive to determining that the record includes the indication of the location, the annotation module 208 access the annotation that corresponds with the location, and at operation 308 applies a text string of the annotation to the record within the report.

Figure 4:
FIG. 4 is a flowchart depicting a method of automatically selecting an annotation to assign to a record, according to certain example embodiments

FIG. 4 is a flowchart depicting a method 400 of automatically selecting an annotation to assign to a record within a report, according to certain example embodiments. Operations of the method 400 may be performed by the modules described above with respect to FIG. 2. As shown in FIG. 4, the method 400 includes one or more operations 402, 404, and 406.

At operation 402, the report module 202 receives an input that includes an identifier. For example, the identifier may identify a vehicle, or a client device 122, such as the vehicle or client device 122 discussed in the method 300. In some example embodiments, the display module 206 may cause display of a GUI configured to receive an identifier as a selection, or input provided by a user of the annotation system 124.

At operation 404, the annotation module 208 accesses a report associated with the identifier, wherein the report comprises vehicle data associated with the vehicle. For example, the report may include an ELD report associated with a vehicle that comprises a listing of driving segments and locations of the vehicle over a period of time.

At operation 406, the display module 206 causes display of a presentation of the report, wherein the presentation of the report includes a display of one or more records. Accordingly, annotations may be applied to the records based on operations of the method 300 discussed above, and the locations indicated within the records.

Figure 5:
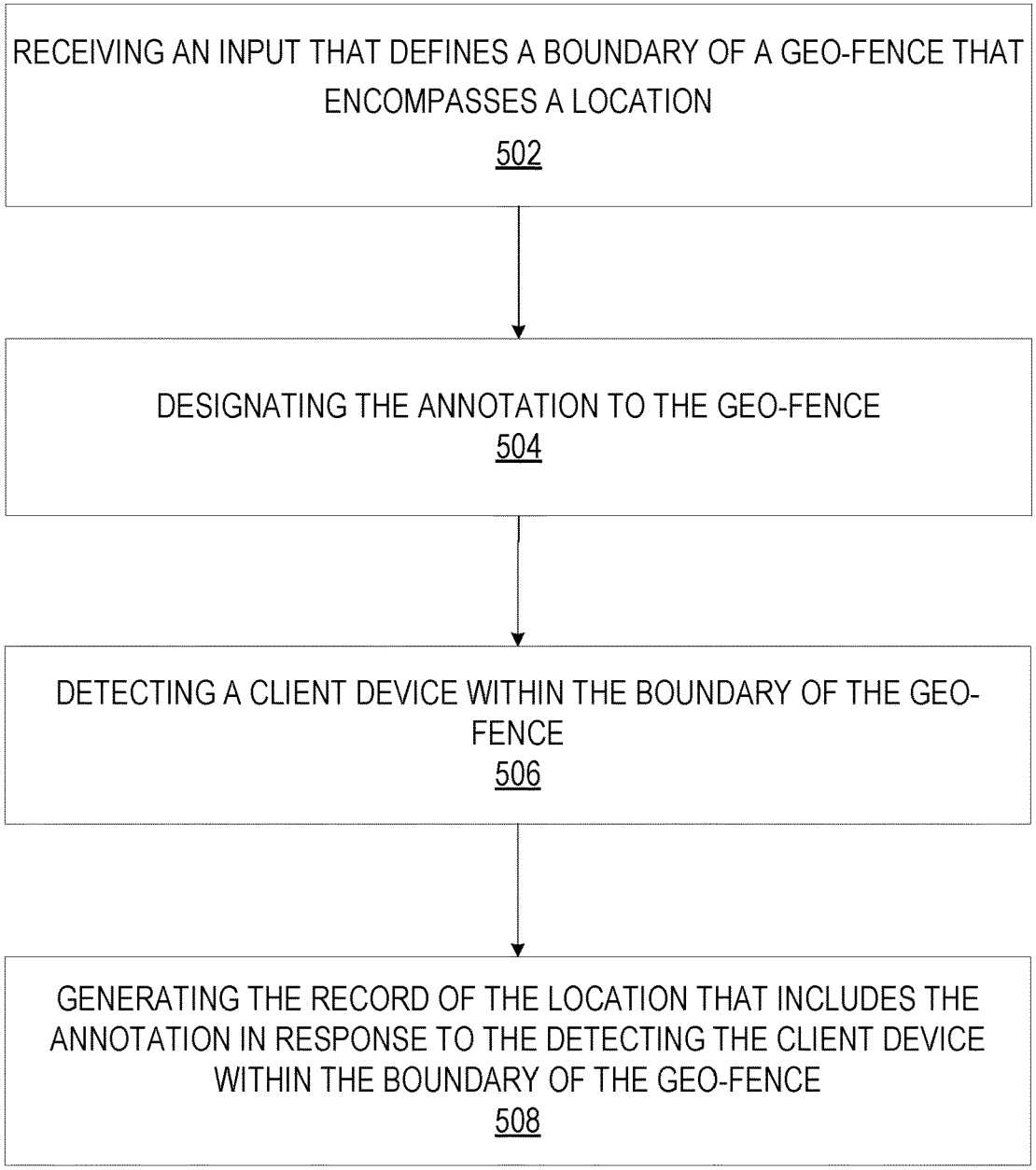
FIG. 5 is a flowchart depicting a method of generating a record of a report, according to certain example embodiments.

FIG. 5 is a flowchart depicting a method 500 of generating a record for a report, according to certain example embodiments. Operations of the method 500 may be performed by the modules described above with respect to FIG. 2. As shown in FIG. 5, the method 500 includes one or more operations 502, 504, 506, and 508.

At operation 502, the location module 204 receives an input that defines a boundary of a geo-fence, wherein the geo-fence encompasses a location. For example, the user of the automated annotation system 124 may provide inputs that define a boundary within a map image, for example by selecting a set of points, or by drawing a closed shape upon the map image.

At operation 504, the annotation module 208 designates an annotation to a geo-fence. By doing so, the automated annotation system 124 may generate a record of a location or driving segment that occurs within the boundary of the geo-fence. For example, responsive to detecting a vehicle or device within the boundary of the geo-fence, or detecting a driving segment that occurs within the boundary of the geo-fence, the automated annotation system 124 may generate a record that includes an identifier of the vehicle or device, along with additional information which may be collected by the vehicle or device. For example, in some embodiments, responsive to detecting the vehicle or driving segment within the boundary of the geo-fence, the report module 202 may cause one or more sensor devices 102 at the vehicle to generate a data packet that comprises vehicle information which includes: a date; a time; engine hours; driving time; vehicle miles; driver ID; and location data.

Accordingly, at operation 506, the location module 204 detects a vehicle or client device (i.e., the client device 122) within the boundary of the geo-fence. In some embodiments, the location module 204 may receive location data from the vehicle or client device responsive to a trigger event. For example, in some embodiments, a vehicle may be equipped with a client device 122 which may be configured to transmit location data to the automated annotation system 124 responsive to detecting that an ignition of the vehicle has been keyed on or off, or responsive to detecting that the vehicle begins to move. In further embodiments, the location module 204 may simply access location data from the vehicle or client device responsive to detecting the vehicle or client device within the boundary of the geo-fence.

At operation 508, responsive to the location module detecting the vehicle or client device within the boundary of the geo-fence, the report module 202 generates a record associated with an identifier of the vehicle or client device, wherein the record includes the annotation associated with the geo-fence by the annotation module 208.

In some embodiments, the record may further comprise vehicle or client device attributes and information that includes temporal data, and driving segment data, wherein the driving segment data includes an indication of a duration of a driving segment, a distance of a driving segment, an identification of a driver of the vehicle, and a time of the driving segment.

Figure 6:
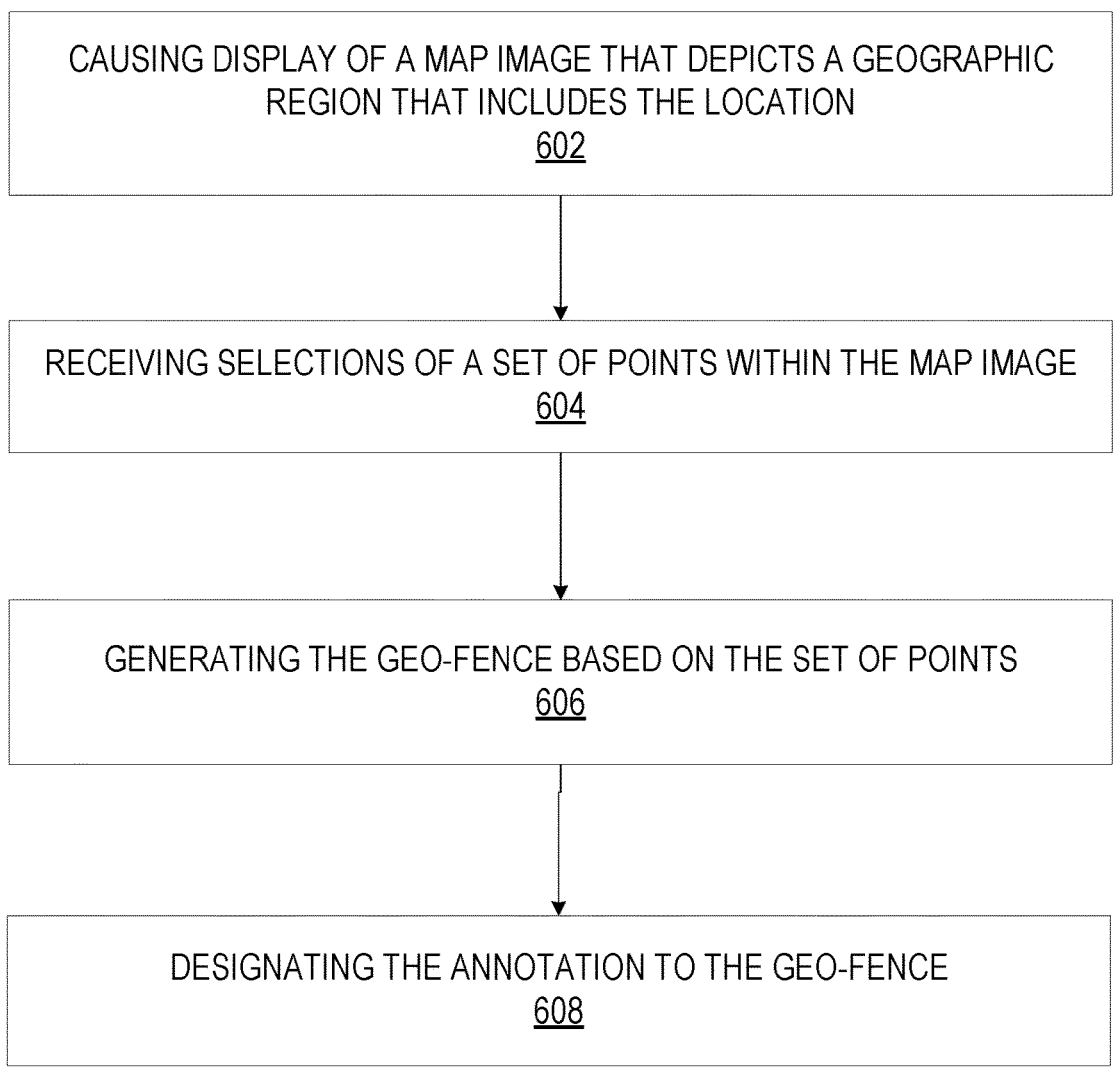
FIG. 6 is a flowchart depicting a method of designating an annotation to a location, according to certain example embodiments.

FIG. 6 is a flowchart depicting a method 600 of designating an annotation to a location, according to certain example embodiments. Operations of the method 600 may be performed by the modules described above with respect to FIG. 2. As shown in FIG. 6, the method 600 includes one or more operations 602, 604, 606, and 608. The method 600 may be performed as a precursor to, or subroutine of, one or more of the operations of the method 500, as depicted in FIG. 5.

At operation 602, the display module 206 generates and causes display of a GUI that includes a display of a map image that depicts a geographic region. In some embodiments, a user of the automated annotation system 124 may provide an input that identifies or otherwise selects a geographic region. For example, the GUI 700 depicted in FIG. 7 includes a display of a map image 705 that depicts a geographic region.

At operation 604, the display module 206 receives an input that defines a boundary within the map image displayed within the GUI. For example, a user of the automated annotation system 124 may provide inputs that select one or more points within the map image, or an input that draws the boundary upon the display of the map image. Responsive to the display module 206 receiving the input that defines the boundary, at operation 606, the location module 204 generates a geo-fence based on the boundary.

At operation 608, the annotation module 208 designates an annotation to the geo-fence. For example, the display module 206 may present one or more interface elements, such as the interface elements 710, that enable a user of the automated annotation system 124 to input a text string of an annotation, and to designate the annotation to a location.

Figure 7:
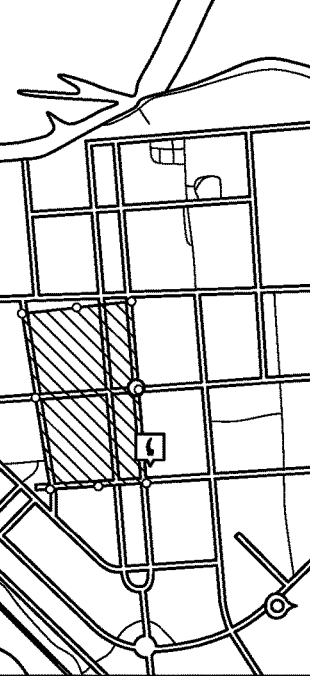
FIG. 7 is an interface diagram depicting a graphical user interface (GUI) presented by an automatic annotation system, according to certain example embodiments.

FIG. 7 is an interface diagram depicting a GUI 700 generated and presented by the automated annotation system 124, according to certain example embodiments, and as discussed above. As seen in FIG. 7, the GUI 700 presented by the automated annotation system 124 may include a display of a map image 705, a set of interface elements 710 to designate an annotation to a location, a search window 715, and a report window 720, configured to display a report that comprises a plurality of records.

For example, as discussed in the method 600, a user of the automated annotation system 124 may define a boundary of a geo-fence by providing inputs via the GUI 700, wherein the inputs may include a selection of points within the map image 705. The automated annotation system 124 may generate a geo-fence based on the boundary defined based on the user inputs. According to certain example embodiments, the user may provide inputs via the interface elements 710 to define a text string of an annotation, and to designate the annotation to the location encompassed by the boundary of the geo-fence.

As seen in FIG. 7, the GUI 700 may include a search window 715 configured to receive a query term from a user of the automated annotation system 124. The query term may for example include an identifier, such as a vehicle identifier or a device identifier, or in some embodiments includes an identification of a location that may comprise a set of geolocation coordinates, an address, or a geo-fence identifier.

According to certain example embodiments, the automated annotation system 124 may present a report within the report window 720, based on an input received via the search window 715. For example, a user may provide an input that specifies a vehicle identifier of a vehicle. Responsive to receiving the input that specifies the vehicle identifier, the automated annotation system 124 may generate and cause display of a report within the report window 720, wherein the report comprises a plurality of records associated with the vehicle identifier.

According to certain example embodiments, the records, such as the record 725, may comprise vehicle information that includes a listing of trips, or driving segments, of the vehicle, wherein the driving segment comprises: an identification of a starting point of the driving segment and a destination of the driving segment; a duration of the trip, a distance of the trip, a start time of the trip, as well as any annotations which may be designated to the record. as illustrated by the trip indicator 725 of the record displayed within the report window 720.

Figure 8:
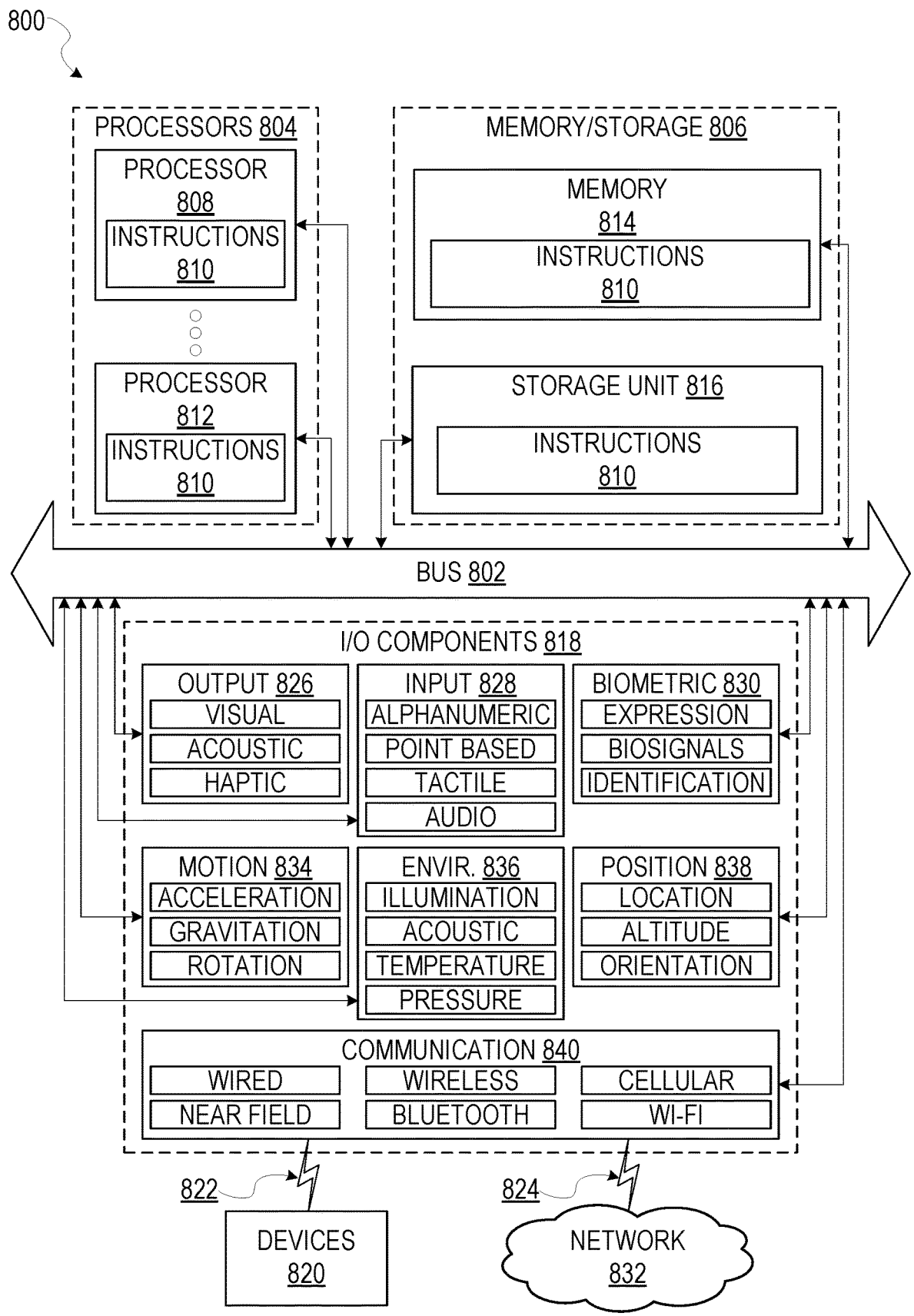
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810(e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental environment components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a Universal Serial Bus (USB)).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    presenting, at a computing device, an interface to receive an annotation that comprises a text string to be applied to a location;
    designating, within a database, the annotation received via the interface to a geo-fence that comprises a boundary that encompasses the location;
    detecting, within the boundary of the geo-fence, a portion of a trip segment associated with a vehicle, the trip segment comprising a set of trip segment attributes that include a starting location, a destination location, a duration of the trip segment, and a distance value of the trip segment;
    receiving an input that specifies an identifier associated with the vehicle; and
    presenting a record of the location within a graphical user interface (GUI) at the computing device responsive to the detecting the portion of the trip segment within the boundary of the geo-fence, the GUI including a display of a report that comprises a plurality of records associated with the vehicle associated with the identifier specified by the input the record of the location comprising a presentation of the set of trip segment attributes for the trip segment and the annotation that comprises the text string.

2. The method of claim 1, wherein the identifier includes a vehicle identifier.

3. The method of claim 2, wherein causing display of the presentation of the report further comprises:
    accessing the report associated with the vehicle identified by the vehicle identifier;
    identifying the record from among the plurality of records based on the location;
    selecting the annotation from within the database based on the record that identifies the location; and
    applying a display of the text string of the annotation to a display of the trip segment associated with the record at the computing device.

4. The method of claim 1, wherein the distance value corresponds to a distance covered by the trip segment and the duration includes a time of the trip segment.

5. The method of claim 1, wherein the set of trip segment attributes comprises a driver id for a driver of the vehicle.

6. The method of claim 1, wherein the generated record of the location further comprises the text string of the annotation designated in the database for the geo-fence comprising the boundary that encompasses the location.

7. The method of claim 1, further comprising:
    receiving selections of a set of points within a map image depicting the location; and
    generating the boundary based on the set of points.

8. A system comprising:
    at least one sensor device to generate sensor data comprising a plurality of data streams;
    a memory; and
    at least one hardware processor to perform operations comprising:
    presenting, at a computing device, an interface to receive an annotation that comprises a text string to be applied to a location;
    designating, within a database, the annotation received via the interface to a geo-fence that comprises a boundary that encompasses the location;
    detecting, within the boundary of the geo-fence, a portion of a trip segment associated with a vehicle, the trip segment comprising a set of trip segment attributes that include a starting location, a destination location, a duration of the trip segment, and a distance value of the trip segment;
    receiving an input that specifies an identifier associated with the vehicle; and
    presenting a record of the location within a graphical user interface (GUI) at the computing device responsive to the detecting the portion of the trip segment within the boundary of the geo-fence, the GUI including a display of a report that comprises a plurality of records associated with the vehicle associated with the identifier specified by the input the record of the location comprising a presentation of the set of trip segment attributes for the trip segment and the annotation that comprises the text string.

9. The system of claim 8, wherein the identifier includes a vehicle identifier.

10. The system of claim 9, wherein causing display of the presentation of the report further comprises:
    accessing the report associated with the vehicle identified by the vehicle identifier;
    identifying the record from among the plurality of records based on the location;
    selecting the annotation from within the database based on the record that identifies the location; and
    applying a display of the text string of the annotation to a display of the trip segment associated with the record at the computing device.

11. The system of claim 8, wherein the distance value corresponds to a distance covered by the trip segment and the duration includes a time of the trip segment.

12. The system of claim 8, wherein the set of trip segment attributes comprises a driver id for a driver of the vehicle.

13. The system of claim 8, wherein the generated record of the location further comprises the text string of the annotation designated in the database for the geo-fence comprising the boundary that encompasses the location.

14. The system of claim 8, further comprising:
   receiving selections of a set of points within a map image depicting the location; and
   generating the boundary based on the set of points.

15. A non-transitory machine-readable storage medium comprising instructions that, when executed by one or more processors of a machine, cause the machine to perform operations comprising:
   presenting, at a computing device, an interface to receive an annotation that comprises a text string to be applied to a location;
   designating, within a database, the annotation received via the interface to a geo-fence that comprises a boundary that encompasses the location;
   detecting, within the boundary of the geo-fence, a portion of a trip segment associated with a vehicle, the trip segment comprising a set of trip segment attributes that include a starting location, a destination location, a duration of the trip segment, and a distance value of the trip segment;
   receiving an input that specifies an identifier associated with the vehicle; and
   presenting a record of the location within a graphical user interface (GUI) at the computing device responsive to the detecting the portion of the trip segment within the boundary of the geo-fence, the GUI including a display of a report that comprises a plurality of records associated with the vehicle associated with the identifier specified by the input the record of the location comprising a presentation of the set of trip segment attributes for the trip segment and the annotation that comprises the text string.

* * * * *